Figure 1:
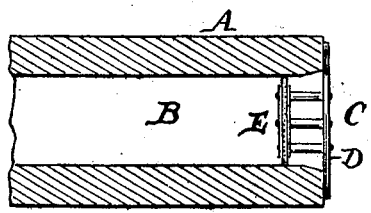

No. 849,415. PATENTED APR. 9, 1907.
W. L. McGOWAN.
PLUG FOR SEALING UNDERGROUND CONDUITS.
APPLICATION FILED APR. 28, 1905.

Attest
P. M. Kelly
M. J. Eyre

Inventor
W. L. McGowan
By his atty

UNITED STATES PATENT OFFICE.

WILLIAM L. McGOWAN, OF PHILADELPHIA, PENNSYLVANIA.

PLUG FOR SEALING UNDERGROUND CONDUITS.

No. 849,415.

Specification of Letters Patent.

Patented April 9, 1907.

Application filed April 28, 1905. Serial No. 257,848.

*To all whom it may concern:*

Be it known that I, WILLIAM L. McGOWAN, of the city and county of Philadelphia and State of Pennsylvania, have invented an Improvement in Plugs for Sealing Underground Conduits, of which the following is a specification.

My invention has reference to plugs for sealing underground conduits, and consists of certain improvements which are fully set forth in the following specification and shown in the accompanying drawings, which form a part thereof.

Heretofore it has been customary to seal the ducts of underground conduits, either temporarily or permanently, by using a tapering wooden plug, the smaller end of which is driven into the duct. In this construction the larger or butt end of the plug projects to some distance beyond the edge of the conduit. This makes a very insecure seal, owing to the shape of the plug, which causes it to contact only with the outer edge of the duct and because it is easily drawn out of position should the outer end be struck or disturbed by something falling upon it. When the plug is disturbed and water rises in any of the excavations made for the conduit to the height of these plugs, they float out on the surface of the water and leave the duct open, thereby permitting foreign matter to enter, with resulting damage and loss. These troubles are more pronounced when a line of conduits is being newly constructed because during a rain-storm the excavation partly or wholly fills with water and the accidental removal of the plug permits mud and dirt to enter the ducts, often requiring that the whole line of conduits shall be taken out, the ducts cleaned, and the conduits relaid. The ends of the ducts are often broken and the sections have to be taken out and replaced with good ones, the damage being caused by forcing the tapered wooden plugs too hard into the ends of the ducts, which being of terra-cotta are somewhat brittle and liable to crack under the strain. Moreover, if the wooden plugs happen to remain in the conduit after becoming soaked with water they swell and split the conduit, requiring expensive repairs.

The object of my invention is to overcome these existing objections to the use of the ordinary wooden plugs in ordinary underground-conduit construction, whether employed for permanent or temporary purposes, and in accomplishing this object I employ a metallic plug of simple construction which embodies two parts, one a sealing or face portion and the other a clamping or retaining portion which extends somewhat into the conduit.

In carrying out my invention I provide a sheet-metal face-plate having attached at its rear side a second plate or retaining portion located at a short distance from the face-plate and having its edges so formed that they grip or hold upon the interior surface of the duct by friction for the purpose of holding the face-plate into position against the outer face of the conduit and over the entrances to the duct for permanent sealing. This face-plate may be perforated and covered with plastic material.

My invention also comprehends details of construction which, together with the above features, will be better understood by reference to the drawings, in which—

Figure 2:
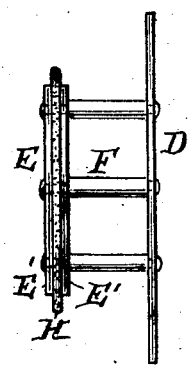
Figure 3:
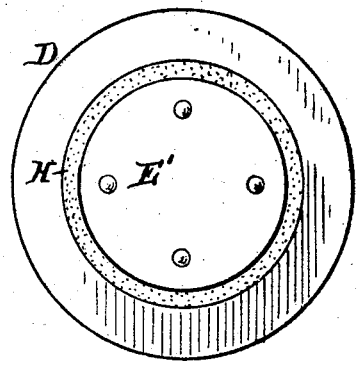
Figure 4:
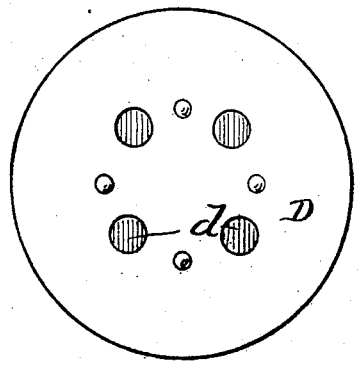
Figure 5:
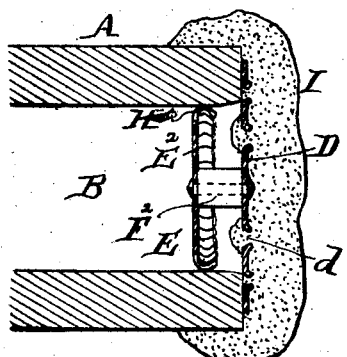
Figure 6:
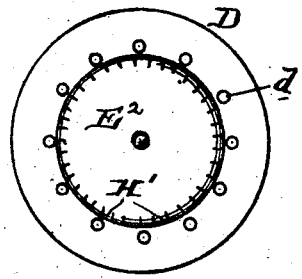
Figure 7:
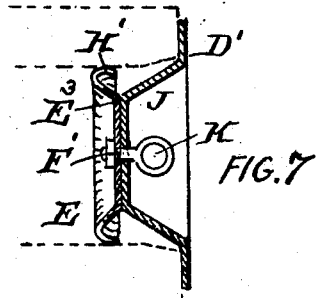
Figure 8:
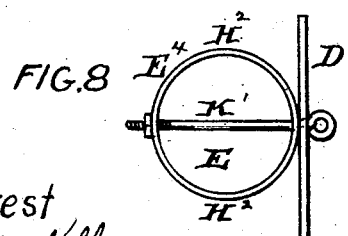
Figure 9:
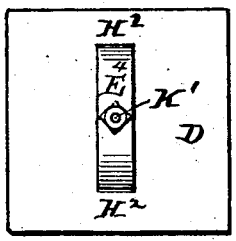

Figure 1 is a longitudinal section through one end of a conduit-section with my improved plug applied thereto. Fig. 2 is a side elevation of the plug removed. Fig. 3 is a rear elevation of same. Fig. 4 is a front elevation of same. Fig. 5 is a view similar to Fig. 1, showing a modified form of my invention used as a permanent seal. Fig. 6 is a rear elevation of the plug shown in Fig. 5. Fig. 7 is a sectional elevation of a modified construction of my plug. Fig. 8 is a side elevation, and Fig. 9 is a rear view, of a modified form of my sealing-plug.

A is the conduit-section, and B is the duct thereof. These sections A are usually formed of terra-cotta, and the entrance of the duct B is slightly flaring at the ends.

C is my improved sealing-plug, and, as shown in Figs. 2, 3, and 4, consists of a front plate D, of sheet metal, preferably having perforations D or other means for handling the plug in withdrawing the same from the duct and for holding the cement mortar when the plug is to be used as a permanent seal. These perforations are preferably formed as shown in Fig. 5, in which their edges are extended outward to form conical depressions upon the inner faces of the plate D adjacent to the apertures. This enables the cement mortar to obtain a more ready hold upon the plate and also to enable it to pass through the apertures and hold to the plate where apertures come against the face of the end of the conduit-section, all of which is clearly shown in Fig. 5. To the rear of the front plate and of smaller area is the retaining-plate E, consisting of two sheet-metal plates E' and a disk of rubber H or other elastic or flexible material suitable for the purpose. These plates D and E are secured together at a distance apart by spacing rivets or studs F, so that when the front plate D is resting against the face of the conduit, the retaining-plate E is located some distance within the duct B, as shown in Fig. 1. The retaining-plate E has the rubber disk H of greater diameter than the plates E' so as to present a flexible rim which is of a diameter slightly greater than the diameter of the duct B. By this means the act of forcing the plate E of the plug into the duct causes the flexible rim to create a friction against the interior walls of the duct and hold the plug in place with the front plate resting against the outer face of the conduit-section.

In place of making the retaining-plate as shown in Figs. 2 and 3, it may be made as shown in Figs. 5 and 6, in which the retaining-plate $E^2$ has its periphery slashed or cut radially and the said slashed portions bent or curled over to form spring edges H', which press against the interior walls of the duct. This is cheaper and more durable than the construction shown in Figs. 2 and 3, and while not so tight it will answer equally well where the outer end of the conduit is covered with cement mortar, as at I in Fig. 5, which would ordinarily be employed where the seal was to be permanent or intended to remain for a long period undisturbed. The cement I may attach itself to the front plate D by entering the apertures $d$. The retaining-plate $E^2$ may be attached to the front plate D in any suitable manner, as by the spacing block and rivet $F^2$.

In Fig. 7 I have shown the face-plate D' with its middle portion stamped inward to form a part J, adapted to enter the end of the duct, and to this is bolted or riveted at F' the retaining-plate $E^3$, which has the slashed or spring edge H'. This plate $E^3$ may be flat, as shown in Fig. 5, or cupped for spacing and central rigidity, as may be desired. The ring K may form an extension of the bolt or rivet F', and is adapted for withdrawing the plug from the duct. While I have shown these retaining-plates in disk or circular form, I do not restrict myself thereto, as they may be of any other shape or form so long as they produce a friction upon the interior of the duct to hold the front plate against the end of the conduit to close the duct.

In Figs. 8 and 9 the front plate D is provided with a rear ring-shaped part $E^4$, held to it by a bolt K', which may be tightened to spread the parts $H^2$ of this ring to increase its diameter, if so desired. When this plug is pushed into the duct, the parts $H^2$ of the retaining-ring press upon the walls of the duct and hold the front plate D in position. The shape of the retaining part which enters the duct may conform to the cross-section of the duct, be it circular or rectangular, or it may be made in any form, so that it only touches a portion of the interior walls of the duct. The intention is that this invention shall be applicable to any shape or form of conduit-section which may be commercially used. Where the front plate is solid or where sealed with cement mortar, the shape of the retaining plate or part within the duct is not of importance; but when the front plate D is perforated and the plug is to be used as a temporary seal it is best that the retaining plate or part shall practically act as a diaphragm across the duct to prevent the influx of mud and dirt.

While the constructions shown are excellently adapted for the commercial adaptation of my invention, I do not limit myself thereto, as the details thereof may be modified without departing from the spirit of the invention.

Having now described my invention, what I claim as new, and desire to secure by Letters Patent, is—

1. The combination of a conduit having a duct, with a sealing-plug consisting of a front plate having a series of perforations and a retaining part frictionally held within the duct for holding the front plate in position against the front of the conduit, and a covering of cement mortar over the end of the conduit and front plate and extending into the perforations thereof so as to bind the cement mortar to the plate.

2. The combination of a conduit having a duct, with a sealing-plug consisting of a front plate having a series of perforations formed with outwardly-extending edges forming conical depressions upon the inner face of the plate adjacent to the apertures, and a retaining part frictionally held within the duct for holding the front plate in position against the front of the conduit, and a covering of cement mortar over the end of the conduit and front plate and extending into the perforations thereof so as to bind the cement mortar to the plate.

3. A sealing-plug consisting of a front plate having a series of perforations formed with outwardly-extending edges forming conical depressions upon the inner face of the plate adjacent to the apertures, combined with a retaining part of smaller area having a flexible rim adapted to be frictionally held within the duct, and rigid connections between the front plate and retaining part whereby they are held apart.

4. A sealing-plug for a conduit consisting of a front plate to fit against the end of the conduit, combined with a retaining part of less size so as to enter the duct and having its circumferential edge adapted to create a friction with the interior walls of the duct, and means for holding the front plate and retaining part in a firm attached condition but so that the circumferential edge of the retaining part is some distance to the rear of the front plate said means consisting of a series of rigid studs F distributed between the said front plate and retaining part and each having shoulders near their ends against which the front plate and retaining part respectively rest and riveted beyond the shoulders at one end to the front plate and at the other end to the retaining part.

5. A sealing-plug for a conduit-duct consisting of a front plate of larger area than the area of the duct and having a series of perforations to receive and hold a sealing cement mortar, combined with a spring-acting retaining part secured to the rear of the front plate and having its rim adapted to create a friction with the interior walls of the duct at some distance from the front plate so as to act upon the interior walls of the duct at a distance from the end of the conduit.

In testimony of which invention I hereunto set my hand.

WILLIAM L. McGOWAN.

Witnesses:
R. M. KELLY,
M. J. EYRE.